Feb. 17, 1959     T. F. KOHMAN ET AL     2,874,306
MEASURING APPARATUS

Filed June 10, 1946                                    2 Sheets-Sheet 1

Inventors:
Truman P. Kohman
Bernard B. Weissbourd
By:
Robert A. Levender
Attorney Feb. 17, 1959　　T. P. KOHMAN ET AL　　2,874,306
MEASURING APPARATUS Filed June 10, 1946　　2 Sheets-Sheet 2

Inventors:
Truman P. Kohman
Bernard B. Weissbourd
By
Robert A. [Attorney signature]
Attorney

United States Patent Office 2,874,306
Patented Feb. 17, 1959

2,874,306

MEASURING APPARATUS

Truman P. Kohman and Bernard B. Weissbourd, Chicago, Ill., assignors to the United States of America as represented by the United States Atomic Energy Commission Application June 10, 1946, Serial No. 675,767

7 Claims. (Cl. 250—83.6)

This invention relates broadly to an apparatus and method for measuring the emission rate of neutrons. More specifically, it relates to a system involving a novel ion chamber assembly for measuring neutron emission of a relatively slow rate from a radioactive sample, thereby making the system useful, among other things, for the determination of the amount of impurity in the radioactive sample.

In the past, ionization chambers containing media such as boron trifluoride ($BF_3$) have been used for measuring the rate of emission of neutrons from a radioactive sample. An outstanding limitation of such ion chambers has been their lack of sensitivity and inability to measure neutron counting rates from very weak sources. Furthermore, such ion chambers do not give sufficient accuracy in measurement at low counting rates and require an unduly long time for measurement for the purposes of the present invention.

An object of the present invention is to provide a novel ion chamber system that is devoid of the above named disadvantages inherent in those common in the art.

A further object of the invention is to provide a specific novel ion chamber assembly and circuit which is useful for measuring very low rates of neutron emission from a radioactive sample so as to make the system useful, among other things, for the purposes of measuring small percentages of impurity in a radioactive sample by virtue of the $\alpha, n$ reaction.

A further object of the invention is to provide a novel method for determining the percentage of impurities in a radioactive sample.

A more specific object of the invention is to provide a novel ion chamber assembly which has high sensitivity and which subtends large effective solid angles for measurement of neutron emission rates.

A further object of the invention is to provide a novel ion chamber assembly that is relatively rugged in construction and well-shielded electrostatically as well as mechanically.

A further object of the invention is to provide a system embodying a plurality of ion chambers for measuring the rate of neutron emission from a radioactive sample, which system involves a high signal-to-noise ratio, thereby being adapted to measure very low neutron emission rates in the presence of relatively high gamma radiation backgrounds.

Other objects and advantages will become apparent from a study of the following specification taken with the accompanying drawings, wherein.

Figure 1:
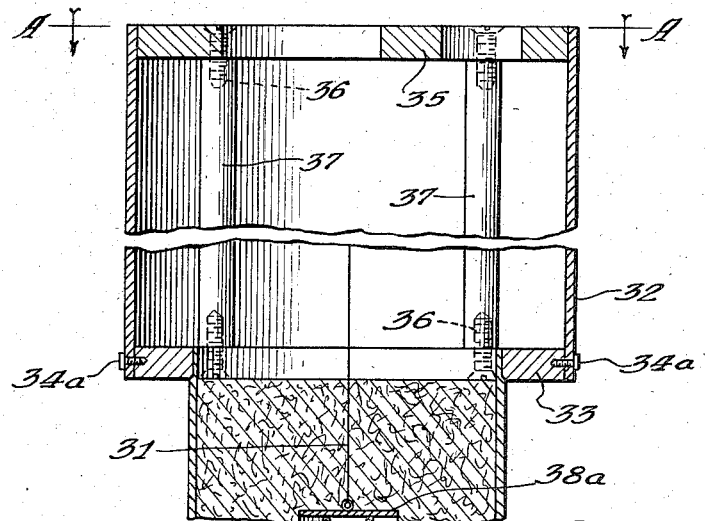
Fig. 1 is a longitudinal cross-sectional view partially in elevation of an ion chamber assembly embodying the principles of the invention, the cross-section being taken in the direction of the arrows of line B—B of Fig. 2.
Figure 1:
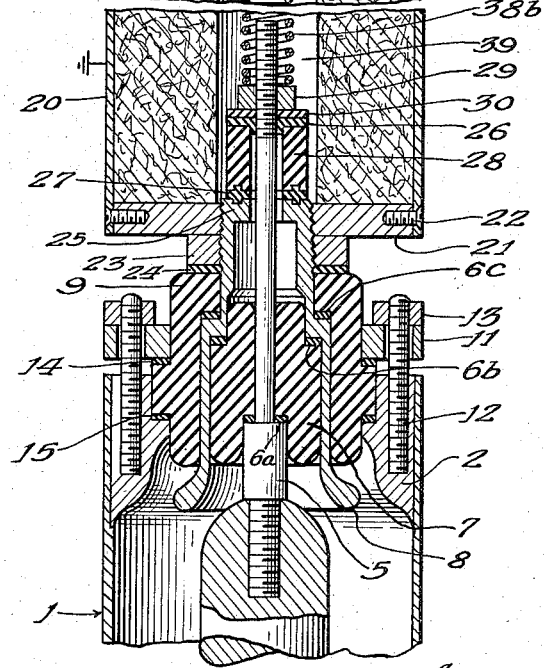
Figure 1:
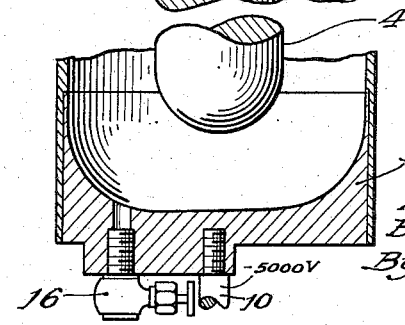

Referring more specifically to Fig. 1, numeral 1 denotes an elongated hollow, metallic, cylindrical ion chamber container having end walls 2 and 3 secured thereto by welding, soldering or other suitable means. A solid cylindrical collecting electrode 4 is coaxially disposed with respect to container 1 and has a lead-in or shaft 5 screwed into one end thereof having a shoulder which abuts a washer 6a of neoprene or other suitable sealing material. The lead-in 5 extends through a closely fitting cylindrical electrical insulator 7. A guard ring 8 is snugly nested between insulator 7 and a second cylindrical electrical insulator 9. Guard ring 8 has an end which flares outwardly for the purpose of completely shielding collecting electrode 4 from insulator 9 inasmuch as insulator 9 is the high potential insulator separating container 1, which has a very high negative potential of the order of —5000 volts applied thereto, from the guard ring 8 which is at ground potential. Such high negative voltage is applied to container 1 by means of an elongated rod 10 which is screwed into end wall 3 of the ion chamber.

The seal for the above described collecting electrode lead-in assembly comprises a ring cap 11 having a plurality of screw threaded holes disposed in equally spaced relationship, through which extend screw threaded studs or bolts such as 12 having one end screwed into the outer or exposed end of end wall 2. The other end has, screw threaded thereon, nuts such as 13. Washers 15 of neoprene and 14 of fiber, for example, are disposed on opposite faces of a collar portion of insulator 9, and provide a gas-tight seal between insulator 9 and end wall 2 as the result of tightening of nuts 13.

Container 1 may be filled with a suitable neutron detecting and ionizing medium, such as, for example, boron trifluoride ($BF_3$). A suitable pressure for the particular voltage used and specific design employed is about 90 cm. of Hg although, as will be readily apparent, other pressures and other voltages may be used to give satisfactory results. Container 1 is evacuated by a suitable vacuum pump (not shown) which may be connected to a valve 16. After the container is evacuated, the $BF_3$ is introduced through valve 16 into the container 1 and brought up to the desirable pressure.

Figure 2:
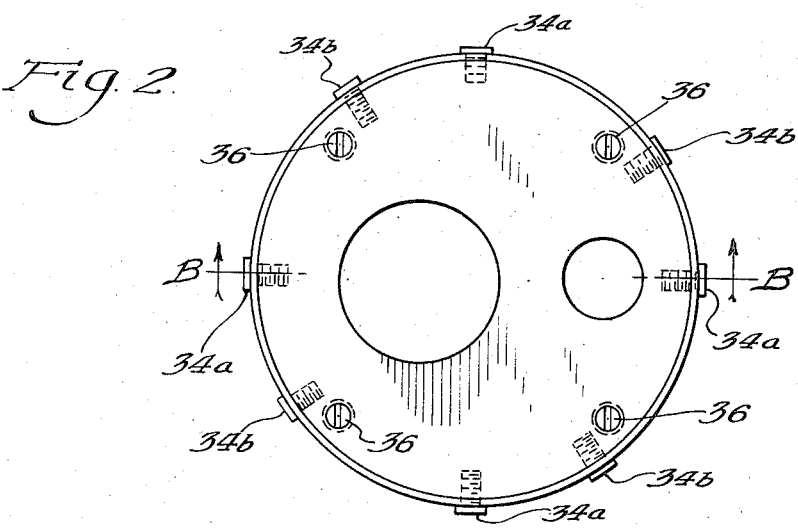
Fig. 2 is an end elevational view taken in the direction of the arrows of line A—A of Fig. 1.

When the ion chamber is completely surrounded by paraffin and exposed to a source of slow neutrons, as will be described more fully hereinafter with respect to Fig. 2, most of the slow neutrons are absorbed by the hydrogen in the paraffin but some are captured by the $B^{10}$ nuclei of the $BF_3$ which disintegrate and give counts. There is a parasitic absorption of slow neutrons not only by the paraffin but by the parts of the ion chamber. In order to reduce this parasitic absorption to a minimum, most of the ion chamber parts are preferably made of a metal which has a low cross-section, that is, a low absorption characteristic, with respect to slow neutrons, such as, for example, aluminum. Container 1 and end walls 2 and 3 as well as collecting electrode 4 may be made of aluminum whereas other parts such as lead-in 5 and ring cap 11 may be made of other material such as steel, and guard ring 8 may be made of brass or dural or other materials even though having a somewhat greater cross-section for slow neutrons than aluminum inasmuch as these parts are relatively small in size and distant from the neutron source.

The ion chamber is made relatively long and narrow so as to provide a high potential gradient between the container 1 and collecting electrode 4 as well as to provide a large volume for the $BF_3$ in the region of greatest neutron density so as to enable the detection of relatively weak neutron sources. It will be apparent that a wide variety of dimensions may be found suitable for the purposes of the present invention. However, in order to better illustrate the invention, typical dimensions of parts of structure that have given satisfactory results will be given as follows. The container 1 may be 16 inches long, 2½ inches in diameter, with a wall thickness of 1/16 of an inch. The collecting electrode 4 may be 1 inch in diameter. The paraffin container 45, to be described in connection with Fig. 3, may be 24 inches in diameter and 32 inches high with a 2 inch hole along its axis through which radioactive sources may be inserted. As described hereinbefore, with a structure having such dimensions, a potential of about −5000 volts on the container 1 and a $BF_3$ pressure of about 90 cm. Hg will give satisfactory results. Again it should be noted that these dimensions are merely illustrative and not limiting insofar as the present invention is concerned.

A hollow, cylindrical container 20, also preferably of aluminum, is disposed coaxially and substantially end to end with respect to container 1. A supporting end plate 21 is connected to one end of container 20 by means of a plurality of screws such as 22. A screw threaded aperture in the center of plate 21 and a nut 23 encircle a shank 25 that is integral with guard ring 8. Nut 23 is screwed so as to tightly compress a neoprene gasket 6c between guard ring 8 and insulator 9 associated with the ion chamber. Fiber washer 24 protects insulator 9 from friction with nut 23. Washers 26 and 27 of fiber, for example, have sandwiched therebetween an insulating ring or separator 28 of methyl methacrylate polymer, commonly known as Lucite, for example. Washers 26 and 27 may be compressed by means of tightening of a nut 29 against a washer 30 both of which may be of brass. The nut 29 is screw threaded to a correspondingly threaded portion of lead in 5. This compresses neoprene gaskets 6a and 6b, thereby completing the gas-tight seal. Container 20 is completely filled with paraffin, except for the hollow region 39. A thin wire 31, made, for example, of copper, is electrically connected to contact plate 38a, and extends axially with respect to container 20 into an axial portion of a third container 32. A spring 38b makes electrical contact between lead-in 5 and contact plate 38a. Container 32 is also coaxial with containers 1 and 20 and is made of iron. Container 32 has a centrally apertured end plate or bulkhead 33 which is secured thereto by means of radially extending screws 34a. The inner periphery of plate 33 defined by the aperture is welded or soldered to an end portion of tube 20 so as to form, in effect, an adjoining chamber defined by container 32 of somewhat larger diameter than that defined by container 20. An apertured end plate 35 is secured to the top end of container 32 by radially extending screws 34b and to the opposite end of container 32 by axially extending screws 36 and spacers 37. The apertures are provided for the purpose of accommodating lead-in wires into a preamplifier circuit (not shown) which is housed within the walls of container 32. Container 32 and container 20 metallically connected thereto form an electrostatic shield for the preamplifier circuit and for the lead-in wire 31 which is connected to the input grid of the preamplifier circuit. Container 32 is grounded, and, therefore, provides a safe structure to handle and provides an electrostatic shield for preventing stray voltages from being induced in the preamplifier circuit.

Figure 3:
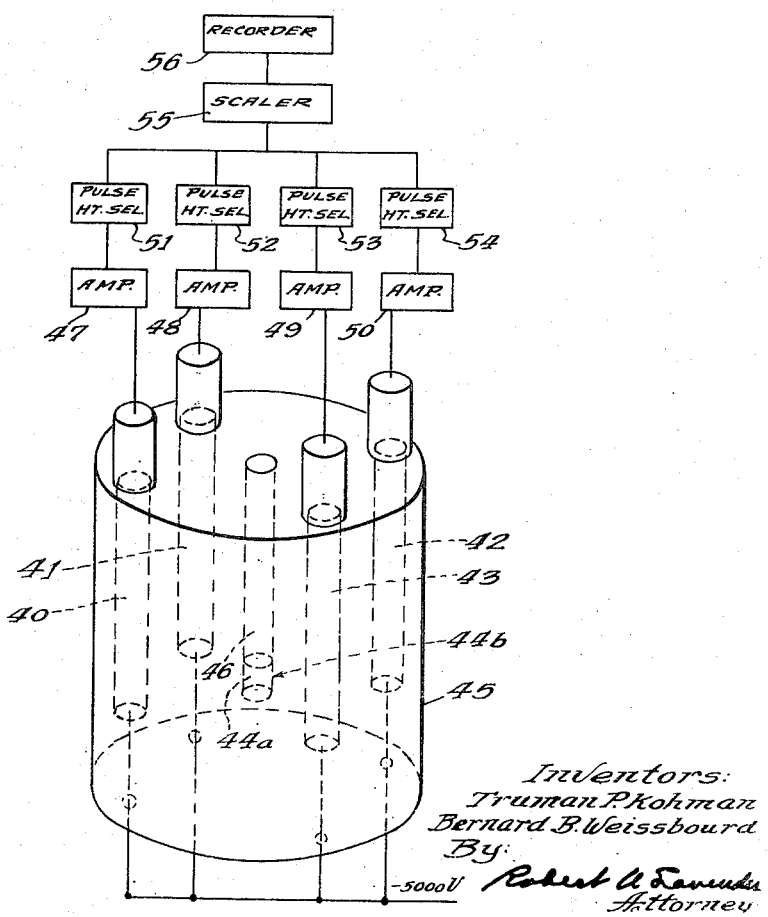
Fig. 3 is a schematic showing of an electrical circuit including a plurality of ion chambers adapted for the measurement of emission rates of neutrons, emitted at slow rates from a radioactive sample.

Fig. 3 shows a neutron emission rate measuring system comprising four units, 40, 41, 42 and 43, each of which is of identical construction with the ion chamber assembly illustrated in Fig. 1. That is, each of the units comprises an ion chamber, a paraffin containing chamber, and a chamber enclosing a preamplifier circuit. Units 40 to 43, inclusive, are disposed in a circular path, equidistantly spaced from each other, and from a hollow region 44b located axially of a large container 45 into which the neutron source 44a is to be measured is inserted. Neutron source 44a is preferably spaced so as to be located equidistantly from the two end portions of each of the ion chambers. Container 45 is completely filled with paraffin with the sole exception of cylindrical slots extending longitudinally thereof which are just large enough in diameter for receiving units 40 to 43, inclusive, as well as the axially extending cylindrical slot 46 for receiving the neutron source 44a. In the particular apparatus described, the axes of the chambers are 2¾ inches from the center of the neutron source. After the source 44a is in place, a long cylinder of paraffin is inserted in the cylindrical slot 46 so as to form a plug for completely surrounding the neutron source with paraffin.

Since paraffin is a hydrogenous substance, it is extremely useful as a neutron slowing material or moderator. Hence, the fast neutrons which emanate from the neutron source 44a, for example, a radium-beryllium source, are effectively slowed down and ultimately a certain number of the slow neutrons will enter container 1 of each unit 40, 41, 42 and 43 to cause alpha emission from the boron content of the $BF_3$, which alpha emission causes ionization pulses which are collected by collecting electrode 4. By virtue of the elongated construction of the respective ion chambers in units 40 and 43, inclusive, a high sensitivity results due principally to the large solid angle provided for counting and to the high disintegration probability for the boron by the slow neutrons present, as well as to the large volume of the ion chamber. By providing a plurality of units, four of which are shown, (although it is to be clearly understood that a different number than four may also be used), it is possible to measure very slow neutron emission rates from source 44a in a relatively short length of time. For example, if it were assumed that neutrons were emitted by source 44a at a rate of 1000 neutrons per minute, then if only one unit were used, the neutron count registered by means of the ion chamber might be of the order of 12 or 13 counts per minute. On the other hand, if four chambers were used instead of one, the counts would be of the order of 50 counts per minute, or four times as many per minute, giving about four times the efficiency.

The system shown in Fig. 3 will give a counting yield, that is, a ratio of counts to neutrons emitted by source 44, of approximately 5 percent. The total background of the four ion chambers is approximately 75 counts per minute. That is primarily due to alpha particle contamination of inner surfaces is shown by cadmium shielding experiments which indicate that only a small fraction of the background is due to cosmic rays or stray neutrons, and by the fact that the background is essentially the same with air or nitrogen in the chambers. A counting yield of 5 percent and a background of 75 counts per minute means that it is possible to detect with 95 percent certainty the emission of about 20 neutrons per minute from a source in a total counting period of 12 hours, and to measure with fair statistical accuracy rates of 100 per minute and over.

Other means might be used for further increasing the sensitivity of detection for neutrons, namely, the coating of the inner surfaces of the ion chambers with carbon thermally deposited from the gas phase to reduce the background from alpha contamination; increasing of the volume of the chambers; use of $BF_3$ of higher purity so as to allow higher pressures; substitution of deuterium oxide for paraffin in the region close to the source and chambers to reduce parasitic neutron capture by hydrogen; and the use of $BF_3$ containing a concentrated $B^{10}$ isotope (since normal B contains only about 18.4 percent of $B^{10}$).

The output from the preamplifiers of each of the units 40 to 43, inclusive, is connected to separate amplifiers 47 to 50, inclusive, shown in block diagram form, which amplifiers, in turn, are connected to separate pulse height selectors 51 to 54, inclusive, respectively. This provision of separate amplifiers as well as separate pulse height selectors for each of the ion chamber units has an outstanding advantage over the more obvious type of circuit wherein all of the preamplifier units are fed into a single amplifier which in turn is fed to a single pulse height selector. By the use of separate amplifiers and pulse height selectors as shown in Fig. 3, the high ratio of signal-to-noise is maintained through the respective amplifiers as distinguished from the system wherein a single amplifier is used for the four preamplifiers wherein such signal-to-noise ratio would be considerably reduced as the result of addition of the noise of the separate preamplifiers in the amplifier. This maintenance of a high signal-to-noise ratio is very beneficial in the counting of low neutron emission rates since it allows the use of higher $BF_3$ pressure without causing the pulses to become smaller than the noise level. This is especially important if the noise level is increased by the presence of strong gamma radiation. The output of the various pulse height selectors is connected to a scaler circuit 55 and a recording circuit 56 both of which are shown in block diagram form since such apparatus is well-known in the art.

Since, as described hereinbefore, the system shown in Fig. 3 is inherently capable of measuring very low neutron emission rates, it is particularly adapted, among other things, to measure the degree of purity of certain elements or materials. Assume that a polonium ($84^{210}$) source 44a is used, which source inherently gives off alpha particles, and assume further that such source has certain impurities such as boron and beryllium which give an $\alpha, n$ reaction, then if it were desired to determine the percentage of such impurities having the $\alpha, n$ reaction, a measurement of the number of neutrons emitted would give an indication of the extent of impurities. This provides a so-called "shotgun" test since it simultaneously determines the total impurities rather than each impurity individually.

By providing a means of testing a material emitting alpha particles, neutron measurement can also assist in the evaluation of the degree of purification in successive steps of a purification process, particularly the elimination of light elements. Gamma-emitting substances may likewise be tested for impurities which undergo a $(\gamma, n)$ reaction.

Since the above described neutron measurements are completely nondestructive of the samples in contrast to other analytical methods, such as chemical methods, the measured preparations used as samples can be used over again for other purposes or submitted to attempts at further purification. Furthermore, the measurement of neutron emission rate may be made within a few hours, hence a sample need not be tied up for more than this length of time as would be required, for example, in certain chemical processes.

Thus, it will be seen that there has been provided an efficient and reliable ion chamber construction for the purposes of measuring low neutron emission rates, and a system including a plurality of ion chamber units arranged in a manner so as to obtain a relatively large counting yield, that is, a large ratio of counts to neutrons emitted by the source, thereby enabling the measurement of extremely low counting rates within a relatively short period of time.

It will be apparent that modifications will be suggested to those skilled in the art after having had the benefit of the teachings of the present disclosure, hence the invention is not limited except insofar as set forth in the following claims.

What is claimed is:

1. A radiation responsive ion chamber for insertion in a body of a neutron moderator material comprising an elongated, gas-filled container serving as a high potential electrode, a cylindrical rod shaped collecting electrode contained within, coaxial with, and substantially coextensive with said container, insulating means for insulatingly supporting said collecting electrode on an end portion of said container, a second container also insulatingly supported on said end portion of said first mentioned container, and being coaxially disposed substantially end to end, with respect to said first container, said second container being filled with paraffin and having a lead-in wire coaxially disposed therein, and a third container secured to the opposite end of said second container and being coaxial and arranged in end-to-end relationship therewith, said third container including an amplifying circuit having an input for connection to said lead-in.

2. Neutron detecting apparatus for insertion in a body of a neutron moderator material comprising, in combination, an ion chamber including an elongated cylindrical container serving as a high potential electrode and a cylindrical rod shaped collecting electrode contained therein, a lead-in assembly at one end of said container comprising a substantially cylindrical guard ring snugly nested between a pair of cylindrical insulators, and a collecting electrode lead-in snugly projecting through the inner insulator; a paraffin-filled, second cylindrical container that it grounded and of substantially the same diameter and forming substantially a continuation of said first container and being electrically connected to said guard ring, said lead-in conductor for said collecting electrode extending along the axis of said second container; a third cylindrical container substantially forming a continuation of said second container, and amplifying apparatus connected to said lead-in and contained within and electrostatically shielded by said third container.

3. Neutron detecting apparatus comprising a container substantially filled with neutron slowing material, a cavity for a neutron source located substantially centrally of said container, a plurality of ion chamber units disposed equidistantly from said source and from each other, and means for electrically translating the ion pulses developed in all of said ion chamber units, each of said ion chamber units comprising an ion chamber, a second chamber of substantially the same diameter as said ion chamber, in end-to-end relationship therewith containing paraffin and containing a lead-in conductor axially thereof, and a third container of substantially the same diameter as said second container, and connected to the opposite end thereof, said third container including a preamplifier circuit whose input is connected to said lead-in conductor.

4. A cylindrical container substantially filled with paraffin having a hole extending along a portion of the axis thereof for introducing a source of neutrons into a substantially central portion of said container, four additional longitudinally extending holes parallel to and equidistantly spaced from said first mentioned hole and from each other, four ion chamber units each of which is disposed in one of said four holes, each ion chamber unit comprising an elongated cylindrical ion chamber, a cylindrical container of substantially the same diameter and in end-to-end relationship with said ion chamber, being filled with paraffin and having a lead-in wire extending axially thereof, and a third cylindrical container of slightly larger diameter than the second and connected to the opposite end thereof, said third container including a preamplifier circuit whose input is connected to said lead-in wire.

5. A system for measuring low rates of emission of neutrons from a source, comprising a plurality of ion chambers irradiated by a single neutron source, each ion chamber including a collecting electrode coaxially disposed with and surrounded by an elongated, cylindrical container serving as the high potential electrode, a plurality of preamplifier circuits each of which has an input connected to said collecting electrode, a plurality of amplifier circuits each having an input connected to the output of one of said preamplifier circuits, a plurality of pulse height selector circuits each having an input connected to the output of one of said amplifier circuits, a scaler circuit connected to the outputs of all of said pulse height selector circuits, and a recorder circuit connected to the output of said scaler circuit.

6. Ionization chamber apparatus for insertion into a block of neutron moderator material comprising, in combination, a cylindrical ionization chamber responsive to neutron irradiation, a cylindrical body of neutron moderator material and an electronic amplifier adapted to amplify signals from said ionization chamber, said chamber, moderator body, and amplifier being mounted in end-to-end relation in the order named as a unitary assembly, and electrical leads traversing said body of moderator material and connecting said ionization chamber to said amplifier, whereby the end of said assembly containing the ionization chamber may be inserted into the block of moderator material to completely surround the ionization chamber with moderator material.

7. Neutron detection apparatus comprising, in combination, the apparatus of claim 6, and a body of neutron moderator material having a cup-shaped cavity in which the ionization chamber is inserted.

References Cited in the file of this patent

UNITED STATES PATENTS

| | | |
|---|---|---|
| 2,189,612 | Pakala | Feb. 6, 1940 |
| 2,206,637 | Fermi et al. | July 2, 1940 |
| 2,303,709 | Siegert | Dec. 1, 1942 |
| 2,308,361 | Fearon | Jan. 12, 1943 |
| 2,349,225 | Scherbatskoy et al. | May 16, 1944 |
| 2,368,486 | Mullane | Jan. 30, 1945 |